March 12, 1946.  W. E. BRILL  2,396,231
SHIP DRIVE CONTROL SYSTEM
Filed Oct. 21, 1943  7 Sheets-Sheet 3

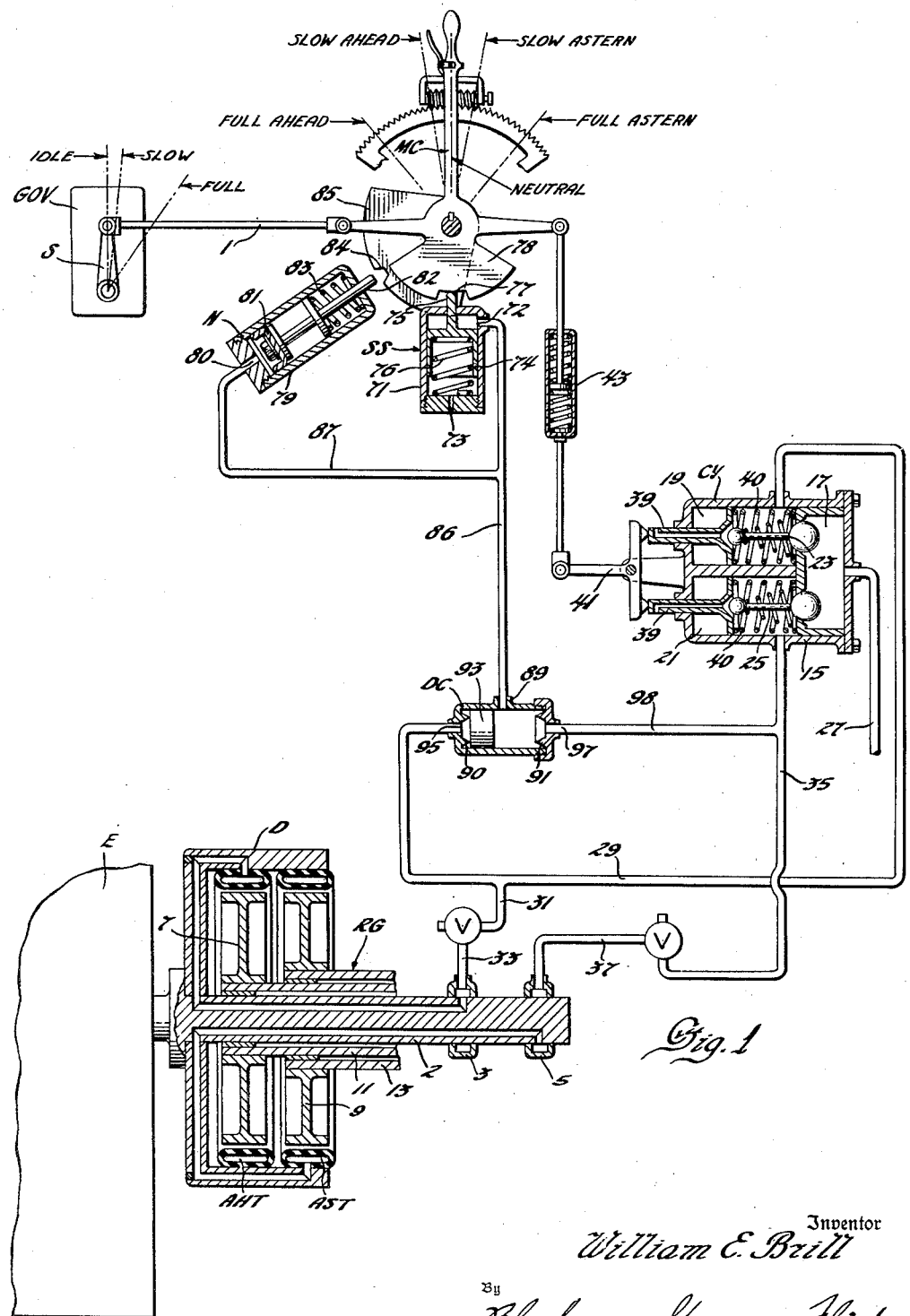

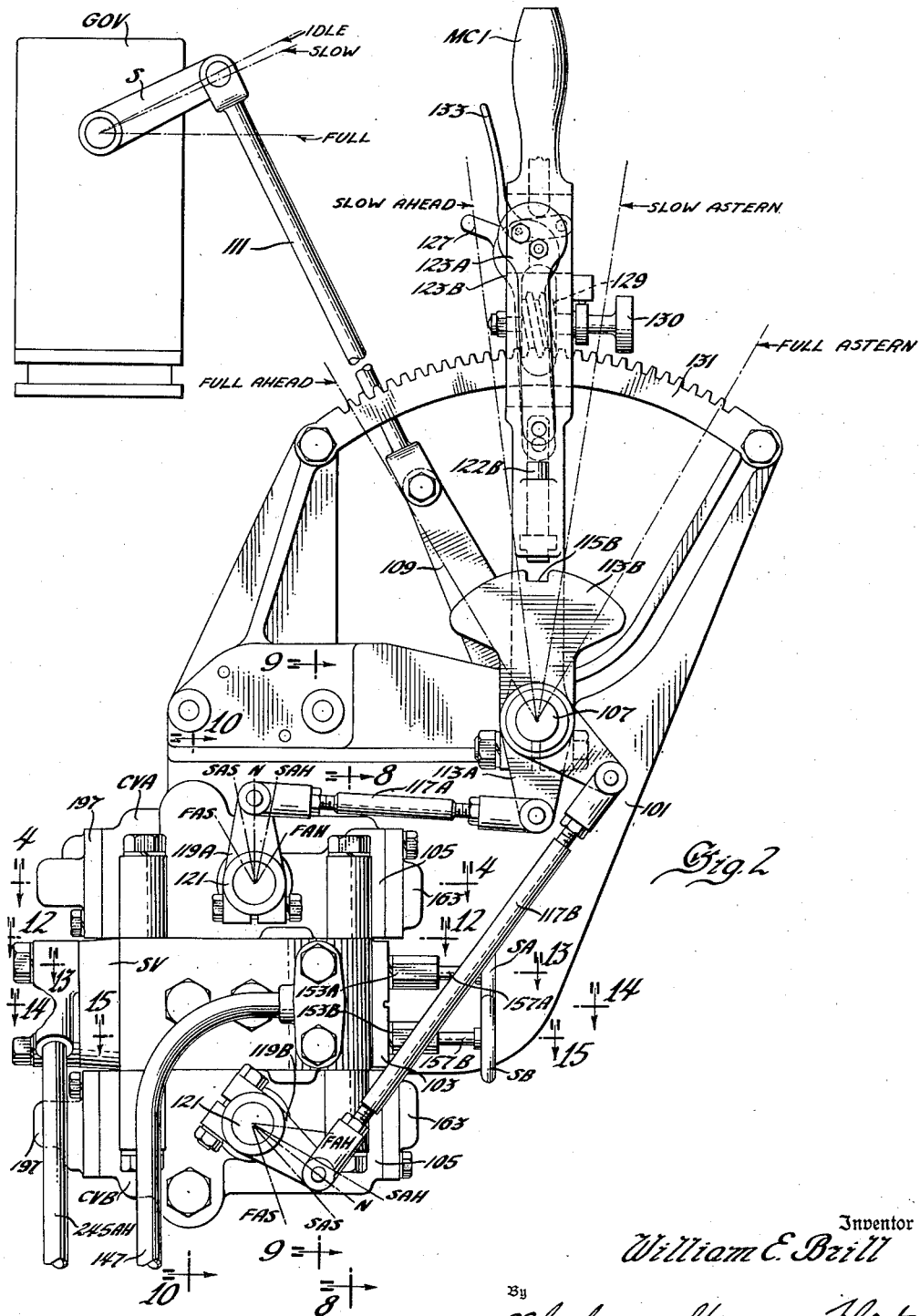

Inventor
William E. Brill
By
Blackmore, Spencer & Flint
Attorneys

March 12, 1946.   W. E. BRILL   2,396,231
SHIP DRIVE CONTROL SYSTEM
Filed Oct. 21, 1943   7 Sheets-Sheet 4

March 12, 1946. W. E. BRILL 2,396,231
SHIP DRIVE CONTROL SYSTEM
Filed Oct. 21, 1943 7 Sheets-Sheet 5

Inventor
William E. Brill
By Blackmore, Spencer & Flint
Attorneys

Inventor
William E. Brill
By Blackmore, Spencer & Flint
Attorneys

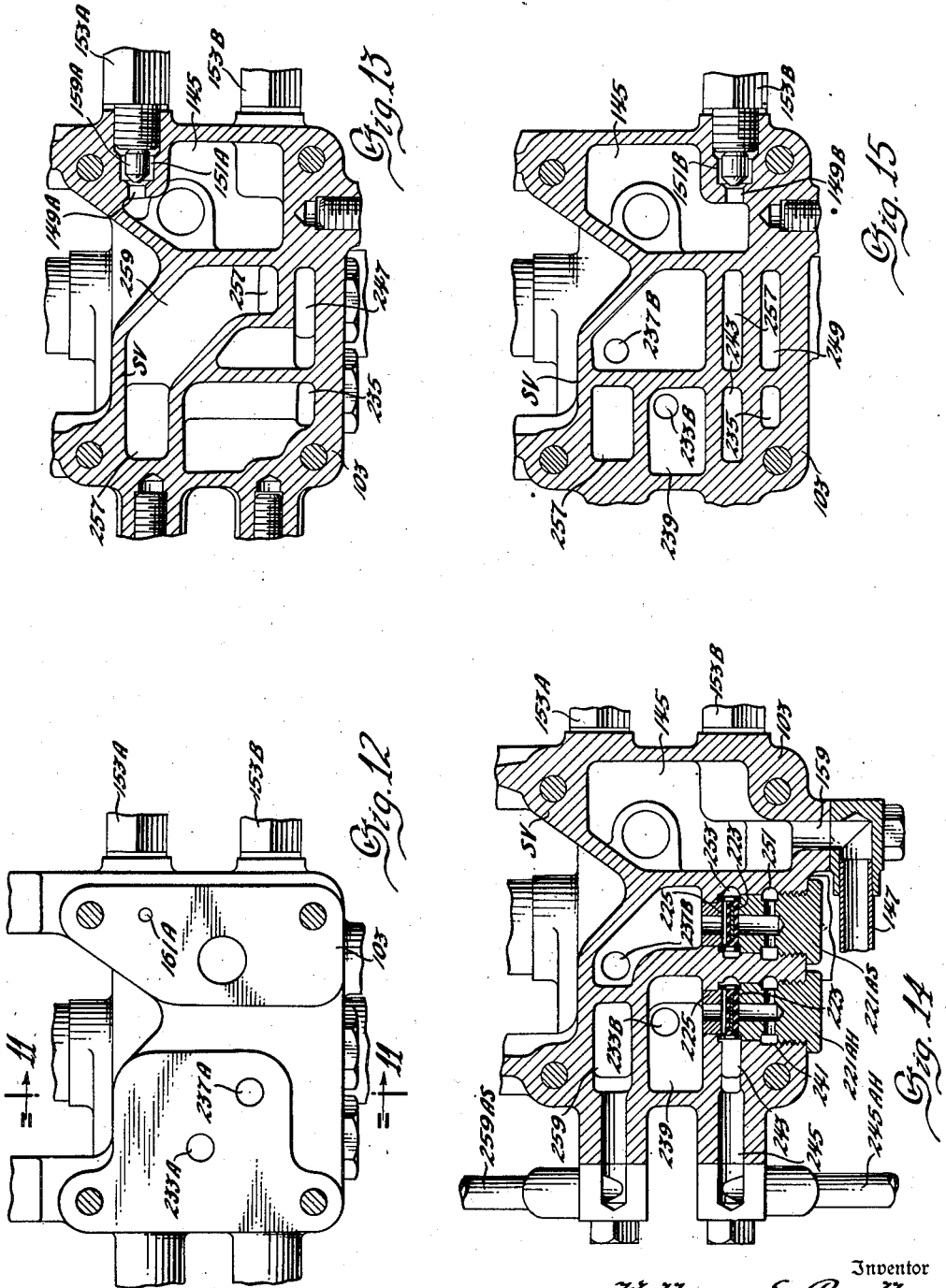

Patented Mar. 12, 1946

2,396,231

UNITED STATES PATENT OFFICE 2,396,231

SHIP DRIVE CONTROL SYSTEM

William E. Brill, Cleveland, Ohio, assignor to General Motors Corporation, Detroit, Mich., a corporation of Delaware Application October 21, 1943, Serial No. 507,099

7 Claims. (Cl. 192—.01)

The present invention generally relates to speed and reversing control systems and more particularly relates to a maneuvering control system for marine propulsion systems.

One object of the present invention is to provide a simple marine maneuvering control system which is operable only in proper sequence by a manually operable maneuvering control lever to cause the application of pressure to one or the other of the pressure engaging elements of engine driven ahead or reverse driving elements, only when both elements are disengaged, and to properly control the speed of the engine during and after engagement.

Another object of the invention is to provide identical control devices in said control system which are selectively operable by said maneuvering control lever to permit removal and repair of one of said devices without rendering the control system inoperative.

Two forms of my control system and arrangement of the control apparatus will be better understood by reference to the following description and accompanying drawings illustrating two modifications of the invention:

Figure 1 of the drawings is a diagrammatic view of one form of my control system and apparatus and control connections with certain of the control elements and propulsion means controlled thereby shown with portions broken away and in section in order to better illustrate the invention.

Figures 2 and 3 are side and end elevation views respectively of the preferred form of the control apparatus incorporating a plurality of identical and selectively operable control apparatus for controlling propulsion means similar to that shown in Figure 1.

Figure 4:
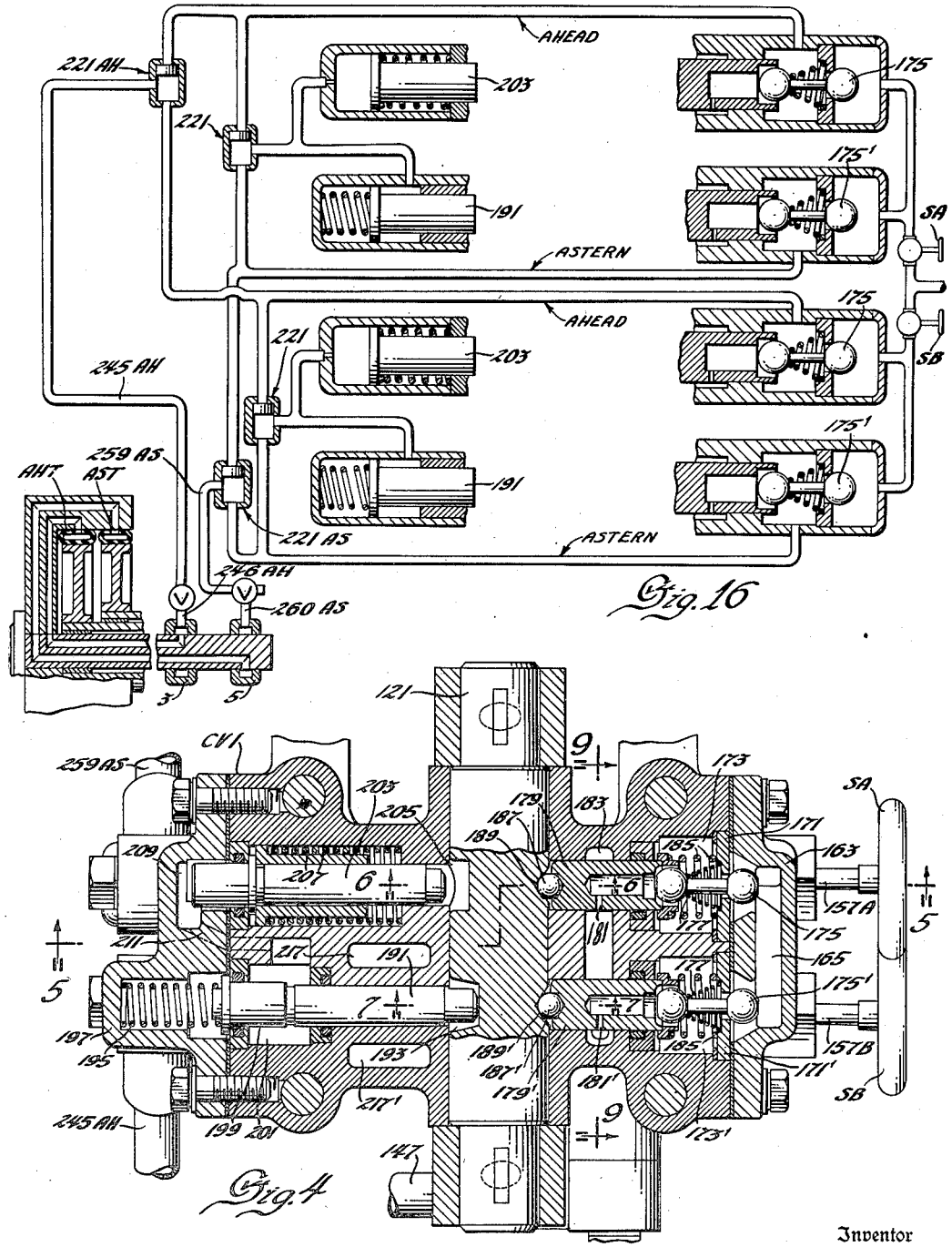
Figure 4 is an enlarged sectional view taken on lines 4—4 of Figure 2 showing the details of one of the two clutch control valves.
Figure 6:
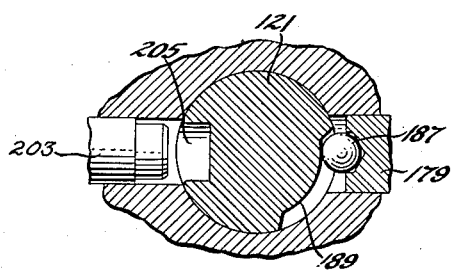
Figure 7:
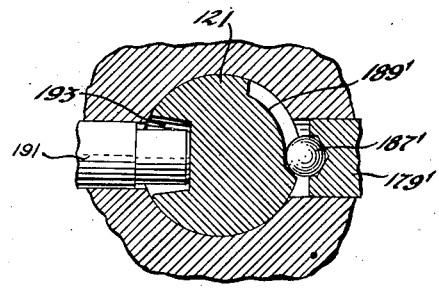

Figures 6 and 7 are enlarged views taken on lines 6—6 and 7—7 of Figure 4 with certain parts broken away and in section to show further details.

Figures 8 to 10 and 12 to 15 are views taken on lines of corresponding number of Figure 2 with parts broken away and in section to show further details of the apparatus.

Figure 11:
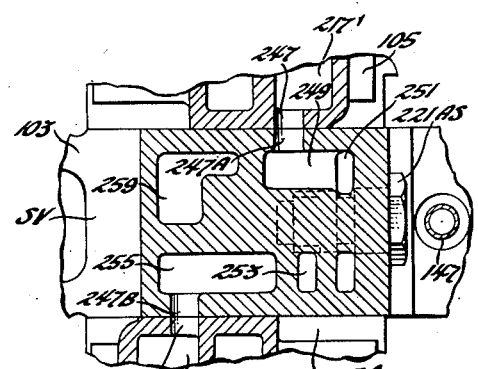

Figure 11 is a view taken on line 11—11 of Figure 12.

Figure 17:
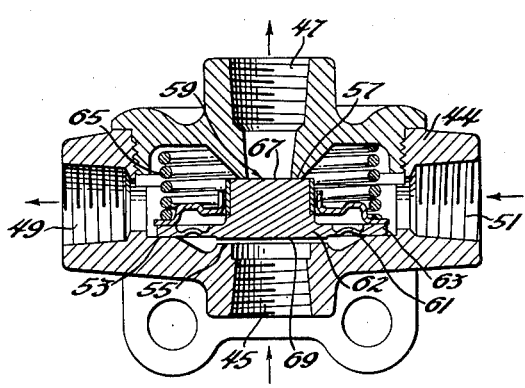

Figure 16 is a diagrammatic view of certain of the control apparatus and control connections of the preferred form of the invention, shown in Figures 2 to 15, with the control connections shown connected to the pressure engaged driving elements of the propulsion means having certain of the elements thereof shown in section, and Figure 17 is a cross sectional view of one of the quick release valves shown diagrammatically in Figures 1 and 16.

The form of the invention illustrated diagrammatically in Figure 1 of the drawings is similar to the preferred form which includes additional features to be described in more detail subsequently.

The control system shown in Figure 1 generally comprises a manually operable maneuvering lever MC which is movable in opposite directions from a neutral non-driving controlling position to slow and full speed ahead and astern driving controlling positions for properly controlling speed varying means of a Diesel engine, and reversing control means of a well known type of a conventional reversing gear driven by the engine.

A portion of the engine is indicated at E, having engine speed varying means comprising a well known type of governor shown generally at GOV which includes conventional engine driven speed responsive means for actuating the conventional engine fuel varying means and conventional means operable by a governor speed setting lever S for varying the speed response of the governor speed responsive means in a well known manner whereby the engine is caused to operate at any one of a plurality of preselected constant values of speed between the idle and full speed values. The maneuvering lever MC is connected by a link 1 to the governor speed setting lever S in such manner that when the maneuvering lever is moved in either direction from the neutral position to either slow speed controlling position the speed setting lever is only moved a slight amount and at a variable rate from an idle position to a slow position to cause a corresponding slight increase in the engine speed, and when the maneuvering lever MC is moved between slow and full speed ahead and astern speed controlling positions the speed setting lever is moved a greater amount and at a variable rate between slow and full speed positions to cause a corresponding increase in the engine speed. Movement of the maneuvering lever from the full and slow speed positions back to the neutral position causes reverse variable rate of movement of the speed setting lever S from the full and slow speed positions to the idle position and a corresponding decrease in the engine speed.

A portion of the reversing gear is indicated at RG. This portion of the reversing gear includes fluid pressure engaged ahead and astern driving mechanisms of a well known type, in which hollow flexible annular tire members AHT and AST are provided between driving and driven members of the clutch mechanism for engagement therewith upon application of pressure to these tires to cause reversal of drive. The tires AHT and AST are shown secured to a clutch driving drum D secured on a driving shaft 2 which is driven by the engine E. The tires are connected by separate pressure passages shown provided in the clutch drum D and shaft 2 to the interior of pressure sealing members 3 and 5, of a well known type, which are supported on the shaft 2 for applying pressure to either of the tires and for venting the tires. Ahead and astern clutch driven drums 7 and 9 are secured to separate hollow shafts 11 and 13 which are rotatably supported in concentric relation with respect to the shaft 2 so that either of the driven drums are engaged and driven by either of the tires when pressure is applied thereto. The shafts 11 and 13 are connected in any well known manner to a ship's propeller shaft, not shown, for causing ahead rotation thereof when pressure is applied to the ahead driving tire AHT or for causing astern rotation thereof when pressure is applied to the astern driving tire AST.

A clutch control valve mechanism indicated generally at CV provides the means for controlling reversal of drive of the propeller shaft. This control valve mechanism comprises a housing 15 provided with a pressure compartment 17 and separate ahead and astern valve compartments 19 and 21 in which dumb-bell valves 23 and 25 are shown spring biased on seats provided in a partition in the housing between the pressure compartment and each of the valve compartments. The pressure compartment 17 is connected by a pipe 27 to a suitable source of pressure, not shown. The ahead valve compartment 19 is connected to the pressure sealing member 3 for the ahead driving clutch tire AHT by means of a quick release valve shown generally at V and connecting pipes 29, 31 and 33 and the astern valve compartment 21 is connected to the other pressure sealing member 5 for the astern driving clutch tire AST by means of another identical quick release valve V and connecting pipes 35 and 37. The quick release valves V are of conventional type, the details of which are best shown in Figure 17 and will be described later on. Each of the dumb-bell valves 23 and 25 are moved off of their seats by individual hollow push rods 39 each of which is shown extending through an opening in each of the valve compartments 19 and 21. Springs 40 are provided to oppose inward movement of the push rods to unseat the dumb-bell valves and to urge valve seat portions, shown, provided on the inner ends of the push rods 39 out of contact with the adjacent inner ball ends of the dumb-bell valves 23 and 25 in order to normally vent the valve compartments to atmosphere through the hollow push rods and to also urge the outer ends of the push rods into contact with the opposite ends of one arm of a T shaped valve operating lever 41, which is pivoted to the housing at its center, so that the lever 41 is normally held in the position as shown. The other arm of this T shaped valve operating lever 41 is operatively connected by means of a resiliently compressible and extensible link 43 to another extension of the maneuvering lever MC so that when it is in the neutral position as shown both of the dumb-bell valves 23 and 25 and push rods 39 will occupy the positions as shown to vent the valve compartments 19 and 21 and piping connections leading to the quick release valve V to cause operation thereof and a quick release of the pressure in the clutch tires AHT and AST and prompt interruption of drive of the propeller shaft by the engine E. The resilient link 43 between the maneuvering lever MC and the actuating lever 41 of the control valve mechanism is provided to permit further movement of the maneuvering lever MC to the full speed positions after causing the unseating of either of the dumb-bell valves 23 and 25 of the control valve mechanism.

The quick release valves, as previously mentioned, are of a well known type, the details of which are best shown in Figure 17. Each valve comprises a housing 44 having coaxially arranged inlet and exhaust ports 45 and 47 located respectively in the lower and upper walls of the housing, and outlet ports 49 and 51 located in the opposite side walls of the housing. Annular valve seats 53 and 55 are concentrically arranged with respect to the inlet port 45 on the inner face of the lower wall of the housing and an annular valve seat 57 is also concentrically arranged with respect to the exhaust port 47 on the inner face of the upper wall of the housing. A circular piston valve indicated generally at 59 having a resilient outer diaphragm portion 61 and a central portion 62 is located between the valve seats of the housing. A seat 63 on the diaphragm portion 61 of the valve is urged onto the lower outer inlet valve seat 53 of the housing by a spring 65 and the resilient diaphragm portion normally urges the upper valve face 67 of the central portion of the valve onto the upper exhaust seat 57 on the housing and holds the lower valve face 69 of the central valve portion in spaced relation with respect to the lower inner inlet valve seat 55 of the housing. With the portions of valve 59 in the normal position, as shown, when pressure is applied to the inlet port 45 below the valve diaphragm portion 61 the upper face 67 of the central valve portion is forced into tighter seating relation with the seat 57 to close the exhaust port 47 and the diaphragm portion 61 and seat 63 thereon are forced upwardly off of the inlet seat 53 to cause a flow of pressure from the inlet port 45 to the outlet ports 49 and 51. When the pressure on opposite sides of the diaphragm is then equalized the parts of the valve 59 assume their normal positions. Upon a reduction in pressure on the lower face of the diaphragm the central portion 62 of the valve is moved downwardly by the increased pressure above the diaphragm portion to force the upper face 67 of the valve off of the upper exhaust seat 57 and the lower face 69 of the valve is seated on the lower inlet seat 55 to close the inlet port 45 and allow pressure to flow directly between the outlet and exhaust ports until the pressure on opposite sides of the diaphragm is again equalized which again causes the parts of the valve to again assume their normal positions as shown.

One outlet port of one of the quick release valves V, shown diagrammatically in Figure 1, is connected directly to the ahead driving clutch tire pressure sealing means 3 by the pipe 33 and the other outlet port is plugged. The exhaust port of this valve is open to atmosphere and the inlet port is connected by pipes 29 and 31 to the valve compartment 19 of the control valve mechanism CV. One outlet port of the other quick release valve V is also plugged and the other outlet port is connected by a pipe 37 to the astern clutch tire pressure sealing means 5, the exhaust port is also opened to atmosphere, and the inlet port is connected to the valve compartment 21 of the control valve mechanism by the pipe 35. By reason of these pipe connections it will be apparent that pressure is applied to the ahead or astern clutch tires AHT or AST by the unseating of either of the dumb-bell valves 23 or 25 in the clutch controlling valve mechanism CV through either of the quick release valves when the maneuvering lever MC is moved in either direction away from the neutral position, and that the pressure in both clutch tires will be quickly released directly to atmosphere through either of the exhaust ports of the quick release valves V to cause prompt interruption of ahead or astern drive when the pressure is reduced in the inlet ports of the quick release valves V upon the venting of the valve compartments 19 and 21 through the hollow push rods 39 of the control valve mechanism CV by movement of the maneuvering control lever MC back to the neutral position.

In order to insure proper manual controlling movement of the maneuvering control lever MC and proper sequence of operation of the above described reversing and speed controlling means in response to this controlling movement, a neutral lever detent indicated generally at N and a slow speed lever detent indicated generally at SS are provided to prevent direct movement of the lever through the neutral and through the slow speed ahead and astern controlling positions to the full speed ahead and astern positions.

The slow speed detent means SS comprises a cylinder 71 having a pressure port 72, a vent port 73, a piston 74 slidable in the cylinder having an integral detent finger 75 extending outwardly through an opening in the cylinder, and spring 76 acting on the piston to cause the detent finger to be normally urged into a slow speed detent slot 77 in a flange 78 of the maneuvering control lever MC. The length of the detent slot 77 in the flange 78 of the lever MS permits movement thereof only between the slow speed ahead and astern controlling positions when the detent finger 75 is urged by the spring 76 into the detent slot 77. The force of the spring 76 on the piston 74 is overcome only by a value of fluid pressure on the piston necessary to cause non-slipping driving engagement of either of the ahead or astern driving tires AHT or AST in order to only then cause the release of the slow speed detent means SS which then allows further manual movement of the maneuvering lever to the full speed ahead or astern driving controlling positions.

The neutral detent means N comprises a cylinder 79 having a pressure port 80, a piston 81 slidable therein provided with a detent finger 82 extending outwardly through an opening therein, and a spring 83 acting on the piston to normally prevent entry of the detent finger 82 into a neutral detent slot 84 in another flange 85 secured to the maneuvering lever MC. The detent slot 84 is of sufficient length and so positioned to permit easy entrance of the detent finger 82 therein only when the maneuvering lever is in the neutral position to retain the lever in this position. The force exerted by the spring 83 is overcome by fluid pressure on the piston 81 of a low value corresponding to a pressure in either the ahead or astern clutch tires AHT and AST just necessary to cause disengagement thereof. The pressure ports 72 and 80 of the neutral and slow speed maneuvering lever detent means are connected by pipes 86 and 87 to a port 89 located mid-between the end seats 90 and 91 of a double check valve shown generally at DC of a well known type having a plunger 93 movable past the port 89 into seating relation with either of the end seats 90 and 91. End ports 95 and 97 are located concentrically with respect to each of the end seats in the check valve. The check valve end port 95 is connected directly to the pipe 29 which is connected by the pipe 31 to the inlet of the quick release valve V, the outlet port of which is connected to the ahead driving clutch AHC by the pipe 33, pressure sealing means 3 and passages in the shaft 1 and the clutch driving member D and the check valve end port 97 is connected by a pipe 98 to the pipe 35 which is connected to the inlet port of the other quick release valve, the outlet port of which, is connected to the astern driving clutch tire AST by the pipe 37, clutch sealing means 5 and passages in the shaft 1 and clutch driving member D.

With the parts of the above described form of the control system in the normal position, as shown, the operation is as follows:

Manual movement of the maneuvering lever MC from the neutral to the slow speed ahead position, where it is prevented from further movement by the slow speed detent means SS, causes the governor speed setting lever S to be moved slightly by the connecting link 1 at an increasing rate from the normal idle engine speed position to the slow speed position to cause a slight increase in the speed of the engine and to also cause the dumb-bell valve 23 of the control valve mechanism to be unseated by the inward movement of the hollow push rod 39 by movement of the valve actuating lever 41 by the resilient link 43 connected to the maneuvering lever MC. This allows pressure to flow from the pressure compartment 17 of the control valve mechanism CV through the ahead valve compartment 19, pipes 29 and 31, quick release valve V, pipe 33 and passages in the shaft 2 and clutch driving member D to the ahead driving clutch tire AHT to cause smooth initial engagement of the tire with the ahead driven clutch member 7 thereby to cause slow speed ahead rotation of the propeller shaft, not shown. As the pipe 29 is also connected to the port 95 of the double check valve DC, a slight pressure rise in this pipe causes the plunger 93 of the double check valve DC to move past the central port 89 and into seating relation with the seat 97 of the check valve to apply pressure to the pistons of both the neutral and slow speed detent means N and SS through the port 89 of the check valve and pipes 86 and 87. With the plunger 93 of the double check valve on the seat 91 thereof no pressure can enter the astern driving clutch tire AST. A slight increase in pressure on the piston 81 of the neutral detent means N causes outward movement of the piston and detent finger 82 thereon against the action of the spring 83 so that the detent finger contacts the flange 85 secured to the maneuvering lever MC at a point adjacent the neutral detent slot 84 therein. Upon a further increase in pressure in the ahead clutch tire AHT and accordingly on the pistons of the detent means to a value necessary to cause non-slipping driving engagement of the tire, the piston 74 of the slow speed detent means SS and detent finger 75 thereon are moved against the action of the spring 76 to cause the release of the slow speed detent means which then allows further manual movement of the maneuvering lever MC to the full speed ahead position. This causes the governor speed setting lever to be moved at a variable increasing rate to the full speed position and a corresponding increase in the speed of the engine and propeller shaft thereby causing full speed ahead rotation of the propeller shaft. The maneuvering lever may then be moved from the full speed ahead position to the neutral position but no further as the neutral detent piston and finger 82 is then moved by fluid pressure into the detent slot 84 of flange 85 secured to the lever MC. The neutral detent N is released only after the pressure in the ahead driving clutch tire AHT has been reduced to substantially atmospheric pressure by action of the quick release valve V in response to the seating of the dumb-bell valve 23 and the venting of the ahead valve compartment 19 and the piping leading to the inlet port of the quick release to atmosphere through the hollow valve push rod in the manner previously described. This also causes the venting of the cylinders of both the detent means to cause the release of the neutral detent means N and engagement of the slow speed detent means SS which permits movement of the maneuvering lever only between the slow speed controlling positions. When the maneuvering lever MC is then moved to the slow speed astern position the governor speed setting lever S is again moved slightly from the neutral to the slow speed position at a variable rate by the link 1 and the other dumb-bell valve 25 in the control valve mechanism CV is unseated by movement of the link 43, lever 41 and other push rod 39. When the valve 25 is unseated, pressure from the pressure compartment 17 flows through the astern valve compartment 21, pipes 35 and 98, the other quick release valve V, the pressure sealing means 5 and to astern driving tire AST and the port 97 of the double check valve DC to cause initial driving engagement of the astern clutch tire and movement of the plunger 93 of the check valve onto the check valve seat 90 which then allows pressure to again enter the cylinders of the neutral and slow speed detent means N and SS in the same manner as previously described. This again causes engagement of the flange 85 of the maneuvering lever MC by the detent finger 82 of the neutral detent means N upon a slight increase in pressure in the tire AST. Upon further increase in the pressure in the astern driving tire AST and on the piston of the slow speed detent means SS to a value necessary to cause non-slipping driving engagement of the tire AST and slow speed astern operation of the propeller shaft by the engine, the slow speed detent means is again released. The release of the slow speed detent means SS then permits movement of the maneuvering control lever to the full speed astern position to cause a corresponding variable increase in the engine speed and propeller shaft thereby causing full speed astern operation of the shaft. The neutral detent means N acts in a similar manner to stop the maneuvering control lever MC in the neutral position, when moved thereto from the full or slow speed astern positions, until the astern clutch tire AST is vented and disengaged by identical action of the other quick release valve V in response to this movement of the lever and the seating of the dumb-bell valve 25 and the venting of the astern valve compartment 21 and the lever detent means thereby again causing the release of the neutral detent means N and engagement of the slow speed detent means SS in similar manner to that previously described.

Figure 3:
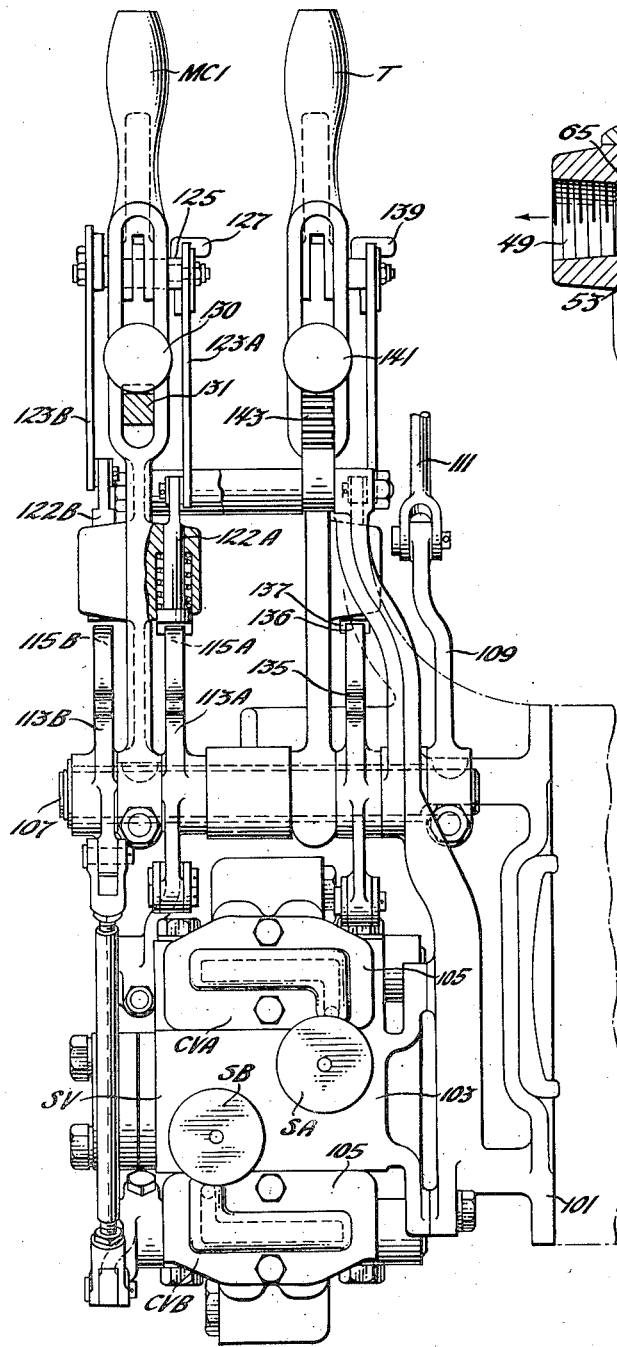

The preferred form of the invention, shown generally in Figures 2 and 3, is adapted to control the speed and reversal of similar propulsion means to that described and shown in Figure 1, however, a pair of identical clutch control valve mechanisms CVA and CVB are provided which are rendered selectively operable by a selector valve mechanism SV and selector means provided on a maneuvering lever MC1. Neutral and slow speed detent means and a double check valve are included in each of the control valves shown mounted on the upper and lower faces of a selector valve housing 103 in which is included selector valves operable by manually operably hand wheels SA and SB for rendering the respective control valves CVA and CVB operative. Two double check valves are also included in the selector valve mechanism SA which enables either of the control valves to be removed for repairs while the other is being operated.

The parts and portions of the two identical clutch control valves CVA and CVB are assigned the same character references, the characters primed indicate the control means therein for the astern driving clutch tire AST and the parts and portions of the selector valve mechanism SV and selector means on the maneuvering control lever MC1 associated with the clutch control valve CVA are assigned numerical character references followed by the letter A and those associated with the clutch control valve CVB are assigned numerical character references followed by the letter B.

As best shown in Figures 2 and 3 a control stand mounting bracket 101 is provided on which is mounted the housing 103 of the selector valve mechanism SV, on the upper and lower faces of which are mounted the identical housing 105 of the control valve mechanisms CVA and CVB. Manually operable speed and reversing control mechanism for the control valves and engine speed controlling means are also mounted on the bracket 101.

The manual control means includes a control shaft 107 mounted for rotation in suitable bearing portions of the mounting bracket 101. To the shaft 107 is secured the maneuvering control lever MC1 and a lever 109 which is connected in a similar manner to that shown in Figure 1, by a link 111 to the speed setting lever S of an engine governor GOV, of the type previously described, for moving the speed setting lever S between idle, slow and full speed positions when the maneuvering lever is moved between a neutral non-driving controlling position and slow and full speed ahead and astern driving positions in a similar manner to that previously described. Control valve actuating levers 113A and 113B are rotatably mounted on the control shaft 107 either side of the maneuvering lever MC1 for selective operation of the control valves CVA and CVB by the maneuvering lever. The actuating lever 113A is provided with a pawl slot 115A and is connected by a link 117A to a lever 119A which is secured on the operating shaft 121 of the upper clutch control valve mechanism CVA. The other actuating lever 113B is provided with a pawl slot 115B and is connected by a link 117B to a lever 119B secured on the opposite end of the operating shaft 121 of the lower clutch control valve mechanism CVB which is shown mounted in an inverted position. The maneuvering control lever MC1 is provided with pawls 122A and 122B slidably mounted on either side of the lever for engagement respectively into the pawl slots 115A and 115B of the control valve actuating levers 113A and 113B. Each of the pawls 122A and 122B are connected by separate links 123A and 123B to separate throws of a crankshaft 125 rotatably supported on the maneuvering lever, which shaft is operable by a manually operable selector lever 127 for causing entrance of either of the lever pawls into either of the pawl slots in the valve actuating levers to cause movement of either of the valve actuating levers 119A or 119B and valve operating shafts 121 to slow or full ahead or astern positions SAH, FAH, SAS and FAS from a neutral position when the maneuvering lever MS1 is moved from the neutral controlling position, as shown, to slow or full speed ahead or astern controlling positions. The maneuvering lever MC1 is also provided with a worm gear pawl 129 slidably and rotatably mounted thereon and provided with a knob 130 for rotating the worm pawl. The worm gear pawl is biased into the teeth of a lever quadrant 131 and is movable upwardly out of engagement therewith by suitable linkage connected to a manually operable delatching lever 133 pivoted on the maneuvering lever. The above described latching means permits the maneuvering lever to be moved between or to be held in the neutral, slow and full speed ahead or astern controlling positions or positions therebetween, and slight adjustment of the lever is accomplished by rotation of the worm gear pawl 129 by the knob 130 when the pawl is engaged with teeth in the lever quadrant 131. An engine throttle actuating lever 135 provided with a pawl slot 136 and a manually operable engine throttle lever T are also rotatably mounted on the shaft 107. A pawl 137 is also slidably mounted on the throttle lever for movement into the pawl slot 136 in the lever 135 by a manually operable selector lever 139 pivoted to the throttle lever and connecting linkage, similar to that provided on the maneuvering lever MC1, to cause movement of the throttle actuating lever 135. The throttle actuating lever may be connected in any suitable manner to the conventional fuel regulating means of the engine, not shown, for also regulating the speed of the engine. The throttle lever T is also provided with worm pawl latching and delatching means, indicated generally at 141 in Figure 3, similar to that on the maneuvering lever MC1 for engagement into teeth in a throttle lever quadrant 143 for moving or holding the throttle lever in any position and for slight adjustment thereof in a similar manner.

Figure 5:
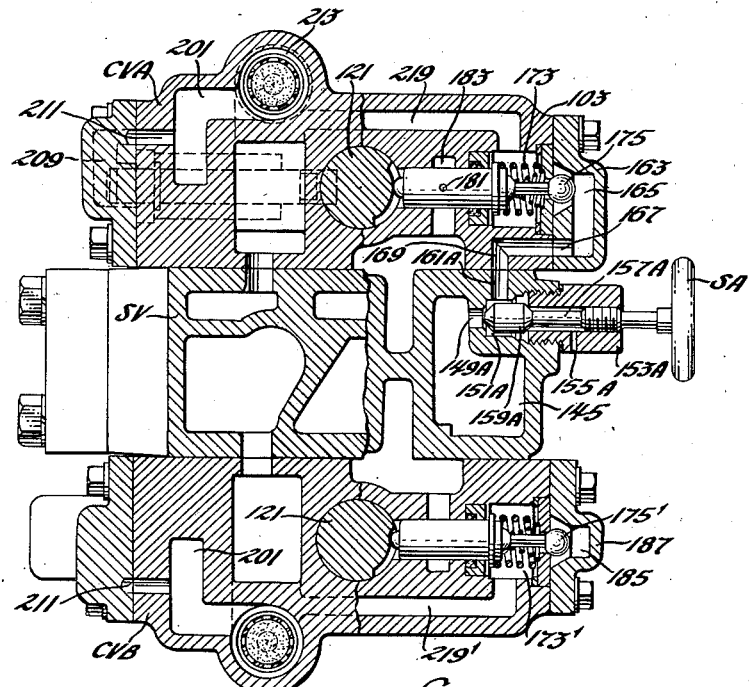
Figure 5 is an enlarged view taken on lines 5—5 of Figure 4 with certain parts broken away and in section to show certain details to better advantage.
Figure 8:
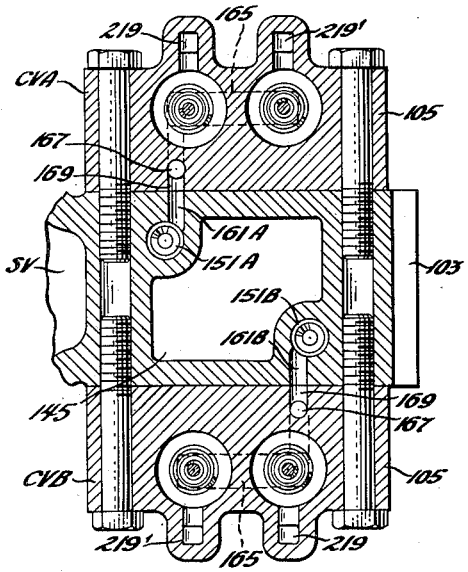

The selector valve housing 103 as best shown in Figures 5, 8, 9 and 13 to 15 is provided with a pressure cavity 145 which, as best shown in Figure 14, is connected by a pipe 147 to a suitable source of fluid pressure, not shown. As best shown in Figures 13 and 15 outlet ports 149A and 149B are provided in the pressure cavity 145 having pressure seat portions extending into separate selector valve cavities 151A and 151B. Valve stem packing nuts 153A and 153B provided with an atmospheric vent hole 155A and 155B respectively, as best shown in Figure 5 are screwed into each of the selector valve cavities 151A and 151B. As best shown in Figures 2, 4, 5 and 13 to 15 the selector valve hand wheel SA is secured to a valve stem 157A threaded into the packing nut 153A which is threaded into an opening in the valve cavity 151A for moving an enlarged diameter inner end portion 159A of the stem, having pressure and exhaust seat portions, into seating relation with the seat portion of the pressure port 149A of the valve cavity 151A or into seating relation with the exhaust seat portion of the packing nut 153A. The other selector hand wheel SB is secured to another identical valve stem 157B threaded into the packing nut 153B threaded into the opening in the valve cavity 151B for similarly moving an enlarged diameter inner end portion 159B of the stem, also having pressure and exhaust seal portions, into seating relation with either the seat portion of the pressure port 149B of the valve cavity 151B or the exhaust seat portion of the packing nut 153B. The selector valve cavities 151A and 151B are respectively connected by separate ports 161A and 161B located in the upper and lower faces of the selector valve housing 103, as best shown in Figures 5 and 8.

Figure 9:
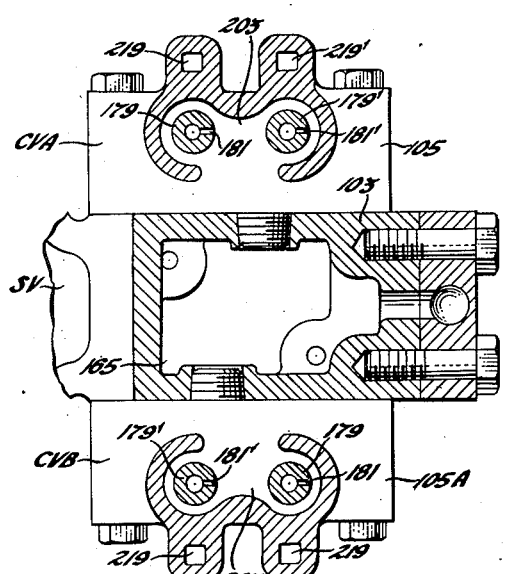

Each of the clutch control valve housings 105 is provided with an end cap 163 having a pressure cavity 165 therein which is connected by a passage 167 with a port 169 in the face of the housing 105. The faces of the clutch control housings 105 are shown secured to the upper and lower faces of the control valve housing 103 by cap screws so that the ports 169 register with the respective ports 161A and 161B in the upper and lower faces of the selector valve housing 103 extending from the selector valve cavities 151A and 151B, as best shown in Figures 4, 5 and 8. As best shown in Figure 4 the control valve cap 163 is secured to the housing 103 and bears on two valve plates 171 and 171' mounted in recesses in the housing 105 adjacent the cap 163. Each of the plates 171 and 171' are provided with ports extending into separate ahead and astern clutch control valve cavities indicated respectively at 173 and 173'. The inner ball ends of ahead and astern clutch control valves of the dumb-bell type, indicated respectively at 175 and 175' are shown in each of these valve cavities. The stems of each of these valves are shown extending through the respective ports in the valve plates 171 and 171' and springs 177 are placed between each of the plates and the inner ball ends of the valves 177 and 177' to normally urge the outer ball ends of the valves on seats provided on the plates 171 adjacent the ports therein to prevent flow of pressure from the pressure cavity 165 to either of the valve cavities 173 and 173'. Push rods 179 and 179' are slidably mounted in suitable openings in the housings between the valves 173 and 173' and the valve operating shaft 121 moving the valves off of their seats. The ends of the push rods adjacent the inner ball ends of the valves are provided with a ball seat and an axial bore extends therefrom to a point between the ends of the push rods and vent holes 181 and 181' extends outwardly from each of the bores into an exhaust cavity 183 surrounding the push rods which is open to atmosphere at the bottom, as best shown in Figure 9. In order to normally vent the valve cavities 173 and 173' to atmosphere through the bores and vent holes 181 and 181' in the push rods and exhaust cavity 183 springs 185 are placed between the valve plates 171 and 171' and each of the outer ends of the push rods 179 and 179' to normally urge the ball seat portions of the push rods out of contact with the inner ball ends of the clutch control valves and to hold the inner ends of the push rod in contact with separate bearing balls 187 and 187' located in separate cam slots 189 and 189' in the control valve operating shaft 121. These cam slots are arranged, as best shown in Figures 6 and 7, so that the two balls 187 and 187' are urged by the push rods 179 and 179' and springs 185 acting thereon into contact with one end each of the cam slots 189 and 189' to normally hold the control valve operating shafts 121 and the levers 119A and 119B in the neutral position N as shown in Figure 2.

As previously mentioned, slow and neutral detent means similar to that described in the form of the invention shown in Figure 1 are included in each of the clutch control valves CVA and CVB. The slow speed detent means as best shown in Figure 4 comprises a plunger 191 slidably mounted in a bore of the housing 105 and having the inner end thereof normally biased into a slow speed detent slot 193 in the shaft 121 directly opposite the cam slot 189' by a spring 195 placed between the outer end of the plunger and a housing cap 197. The plunger is provided with an enlarged diameter piston portion 199 located in a cavity 201 in the housing so that when the pressure in the cavity equals that necessary to cause engagement of either the ahead or astern driving clutches, the inner end of the plunger 191 will be moved out of the detent slot 193. The angular length of the slow speed detent slot 193, as best shown in Figure 7 is greater than the diameter of the inner end of the plunger 191 in order to normally permit movement of the shaft 121 and levers 119A and 119B thereon only to the slow speed positions SAH and SAS indicated in Figure 2 until the plunger is moved outwardly which then permits movement of the shaft and levers to the full speed positions FAH and FAS. The neutral detent means comprises another detent plunger 203 slidably mounted in a parallel bore in the housing, the inner end of which is adapted to enter a neutral detent slot 205 in the shaft 121 opposite the cam slot 189 but is normally biased out of the detent slot by a spring 207. The outer or piston end of the plunger 203 projects into a cavity 209 in the housing cap 197 which is connected by a passage 211 to the cavity 201 in the housing, as best shown in Figure 5, so that when the pressure in this cavity is greater than that necessary to cause initial engagement of either the ahead or astern driving clutches the inner end plunger 203 will be moved into the detent slot 205 when the shaft 121 is moved to the normal or neutral position, as shown. The inner end of the neutral plunger 203 is adapted to fit snugly in the neutral detent slot 205, as best shown in Figure 6, to prevent rotation of the shaft through the neutral position until both the ahead and astern driving clutches are entirely disengaged and drive is interrupted.

Figure 10:
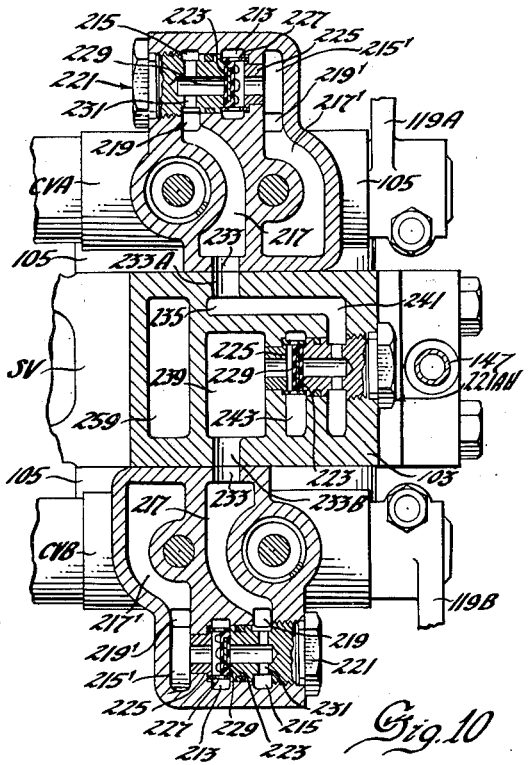

As best shown in Figures 5 and 10, the cavity 201 through which pressure is supplied to the detent plungers 191 and 203 is provided with an annular port 213 located between two other coaxially arranged annular ports 215 and 215', as best shown in Figure 10. The port 215 opens into a housing cavity 217 and a passage 219 extends from the port 215 to the ahead control valve cavity 173 and the annular port 215' opens into a housing cavity 217' and a passage 219', parallel to the passage 219, extends from the cavity 217' to the astern valve cavity 173', as best shown in Figures 5, 8 and 10. As best shown in Figure 10, a double check valve indicated generally at 221 is threaded in an opening in one side of the housing 105 coaxial with the annular ports 213, 215 and 215' and is provided with an annular seat portion 223 fitting in a housing bore between and coaxial with the annular ports 213 and 215, an annular seat portion 225 fitting in a housing bore between and coaxial with the annular ports 213 and 215', a ported sleeve 227 secured between each of these annular seat portions and a circular piston valve member 229 loosely carried in the sleeve and adapted to seat on either of the seat portions. The annular seat portion 223 of the valve 221 is provided with a radial passage 231 opening into the port 215.

As best shown in Figures 10 and 12, the cavity 217 is provided with a port 233 in the face of the upper control valve housing 105 which registers with a port 223A in the upper face of the selector valve housing 103 and the port 233A extends into a passage 235 in the selector valve housing. The cavity 217 in the lower control valve housing 105 is likewise provided with an identically located port 233 the upper face of the housing which registers with a port 233B in the lower face of the selector valve housing 103 and the port 233B extends into a cavity 239 in the selector valve housing. The passage 235 in the selector valve housing 103 extends to an annular port 241 in the housing and another annular port 243 is located coaxial with and between the port 241 and the cavity 239, as best shown in Figures 10 and 13 to 15. Another double check valve indicated generally at 221AH, identical to the double check valve 221 incorporated in each of the control valves CVA and CVB, is threaded in an opening in the side of the selector valve housing 103 coaxial with the annular ports 241 and 243, as best shown in Figures 10 and 14. The annular seat portion 223 of the valve 221AH is located in a housing bore interconnecting the annular ports 241 and 243 and the annular seat portion 225 is located in a coaxial bore between the port 243 and cavity 239. The annular port 243, as best shown in Figure 14, opens into a cavity 245 in the housing 103 and a pipe 245AH, as best shown in Figure 16 is connected between the cavity 245 and a quick release valve V such as shown in Figure 17 and this valve V is connected by a pipe 246AH to the pressure sealing means 3 of an ahead driving tire AHT similar to that described previously with reference to the form of the invention disclosed in Figure 1.

As best shown in Figures 11 to 15, the cavity 217' in the upper control valve housing is provided with a port 247 in the face thereof which registers with a port 247A in the upper face of the selector valve housing 103 and the cavity 217' in the lower control valve housing is provided with an identically located port 247 in the face thereof which registers with a port 247B in the lower face of the selector valve housing. The port 247A extends into a passage 249 having an annular port 251 therein and another annular port 253 coaxial therewith is provided in the housing between the port 253 and a cavity 255 into which the port 247B extends. Another double check valve 221AS, identical to the double check valves 221 and 221AH, is threaded into an opening in the side of the control valve housing 103 adjacent the double check valve 221AH. The seat portion 223 of the valve 221AH is located in a housing bore interconnecting the annular ports 251 and 253 and the valve seat portion 225 is located in a coaxial bore in the housing between the port 253 and the cavity 255. As best shown in Figures 13 to 15 the port 253 opens into a passage 257 extending to a cavity 259 which is connected by a pipe 259AS, as best shown in Figures 14 and 16 to another quick release valve V which is connected by a pipe 260AS to the pressure sealing means 5 of the astern driving tire AST in a similar manner to that described with reference to the form of the invention disclosed in Figure 1.

Figure 16 shows schematically the pressure connections between the selector valve SV and control valves CVA and CVB. The parts of the selector valve and the control valves shown in Figure 16 are assigned the same character references as those shown in Figures 2 to 15 and the pressure cavities, ports and passages associated with the ahead driving clutch tire AHT and the astern driving clutch tire are labeled Ahead and Astern.

The operation of the preferred form of the control system is as follows:

In order to render the upper control valve CVA effective for controlling engagement and disengagement of the pressure engaged ahead and astern driving clutch tires AHT and AST and to render the lower control valve CVB ineffective for controlling these tires the hand wheel SA of the selector valve SV is screwed outwardly and the hand wheel SB is screwed inwardly. With the hand wheel SA screwed outwardly to its limit the end portion 159A of the valve stem 157A is unseated from the seat portion of the port 149A between the pressure cavity 145 and the selector valve cavity 151A in the selector valve SV and the end 159A of the stem is seated on the seat portion of the packing nut 153B to close off the atmospheric vent hole 181 therein. This causes pressure to flow through the pipe 147 connected to the pressure cavity 145 of the selector valve SV and through this cavity and port 149A to the selector valve cavity 151A and to flow outwardly therefrom through the port 161A therein to the cavity 165 in the upper control valve CVA through the port 161A and passage 169 in this control valve. With the hand wheel SB of the selector valve SV screwed inwardly to its limit the portion of the valve stem 157B is seated on the seat portion of the port 149B between the pressure cavity 145 and selector valve cavity 151B and to move the ends 159B of the stem off the seat of the packing nut 153B. This vents the selector valve cavity 151B to atmosphere through the vent hole 155B in the packing nut 153B and also vents the pressure cavity 165 of the lower control valve CVB to atmosphere through the passage 167 and the port 169 therein as the port 169 registers with the port 169B in the selector valve cavity 151B.

In order to cause unseating of either the ahead or astern dumb-bell valve 175 or 175' of the upper control valve CVA to cause pressure to be applied to either the ahead or astern driving tires AHT or AST, in order to cause driving engagement of either, the selector lever 133 on the maneuvering lever MCI is depressed, as shown in Figure 3 which causes the pawl 122A on the maneuvering lever to enter the pawl slot 115A in the actuating lever 113A for the upper control valve CVA which is connected by the link 117A to the lever 119A secured to the operating shaft 121 of the upper control valve. When the maneuvering lever MCI is now moved toward the slow speed ahead position by release of the worm gear latch 129 from the lever quadrant 131 the lever 119A on the upper control valve operating shaft 121 is rotated clockwise to the slow speed ahead position SAH, as best shown in Figure 2, and the speed setting lever S of the governor GOV is also moved slightly from the idle position to the slow speed position by the link 111, which is connected to the lever 109, secured on the control shaft 107 along with the maneuvering lever when it is moved from the neutral to the slow speed ahead position to cause a slight increase in the engine speed. With the maneuvering lever MCI, speed setting lever S and control valve shaft 121 in the slow speed ahead position the lower end of the detent slot 193 in the shaft 121, shown in Figure 7, is moved into contact with the slow speed detent plunger 191 to prevent movement of the shaft 121, lever 119A and the maneuvering lever MCI, and also the governor speed setting lever S beyond the slow speed ahead position. Initial clockwise movement of the shaft 121 from the neutral position, as best shown in Figure 6, causes the ball 187 to be moved out of the cam slot 187 in the shaft 121 which causes the push rod 179 to move into seating engagement with the inner ball end of the ahead dumb-bell valve 175 to close off the atmospheric vent hole 181 in the push rod 179 and further movement of the shaft to the slow speed ahead position causes the outer ball end of the ahead clutch valve 175 to be moved off the seat portion of the port in the valve plate 171. This permits pressure to flow from the upper control valve cavity 165 through the port in the plate 171 into the ahead valve cavity 173 and to flow outwardly through the passage 219 to the control valve cavity 217 and the annular port 215 therein as viewed in Figure 10. Upon an initial rise in pressure above that of atmosphere in the annular port 215 the pressure enters the radial opening 231 and axial opening in the annular seat portion 223 of the double check valve 221 in the upper control valve CVA which causes movement of the piston 229 of this valve to the right off of the seat portion 223 and onto the seat portion 225 of the check valve 221. This permits pressure flow from the annular port 215 through the above openings in the check valve to the adjacent annular port 213 which opens into the cavity 201 in the upper control valve and passage 211 leading therefrom to the cavity 209. The outer piston end portion of the neutral detent plunger is located in the cavity 209 and a slight increase in pressure therein above that of atmosphere is sufficient to cause inward movement of the plunger 203, against the action of the spring 207, so that the inner end of the plunger contacts the periphery of the upper control valve operating shaft 121 adjacent the neutral detent slot 205 therein. The piston portion 199 of the slow speed detent plunger 191 is located in the cavity 201 but the force exerted by spring 195 acting thereon to hold this plunger in the slow speed detent slot 193 is not overcome until the pressure rise in the cavity 201 is sufficient to cause driving engagement of either clutch tire and accordingly the slow speed detent plunger 191 remains in the detent slot 193 until the pressure in the cavity 201 reaches this value.

Pressure in the upper control valve cavity is transmitted through 233 therein and registering port 233A and passage 235 opening into the annular port and enters the radial and axial openings in the double check valve 221AH in the selector valve SV to cause the piston of the check valve to move to the left of the seat portion 223 and into seating relation with the seat portion 225 of the check valve to permit pressure to enter the annular port 243 of the selector valve cavity 245. This cavity is connected by the pipe 245AH to the quick release valve V which is connected, as best shown in Figure 16, by a pipe 246A to the pressure sealing means 3 for the ahead driving clutch tire AHT in identical manner to that described previously in describing the form of the invention shown in Figure 1 of the drawings.

When the pressure in the above described valve cavities and connecting passages therebetween and connections to the ahead driving clutch tire reaches a value sufficient to cause driving engagement of the tire the slow speed detent plunger 191 will be moved out of the detent slot 193 and the maneuvering lever MCI may then be manually moved to the full speed ahead position to cause movement of the governor speed setting lever S to the full speed position and to also cause the lever 119A and operating shaft 121 of the upper control valve CVA to the full speed ahead positions to cause full speed ahead drive of the propulsion means.

Movement of the maneuvering control lever MCI back to the neutral position from the full speed ahead position causes the governor speed setting lever S to be moved to the idle speed position and the lever 119A and operating shaft 121 of the upper control valve to be moved back to the neutral position, as shown, and the neutral detent plunger 203 will be forced into the neutral detent slot 205 by the pressure in the passages and connections between the ahead driving tire AHT and the control valve CVA and the selector valve thereby preventing further movement of these elements to the astern controlling positions. With the above elements in the neutral position the pressure in the ahead control valve cavity 173 will be vented to atmosphere through the axial bore and vent hole 181 in the valve push rod 183 to reduce the pressure in the connecting passages and cavities of the valves and also in the pipe 245AH to the quick release valve V and it will act, in the same manner as previously described, to quickly cause release of the pressure in the ahead tire AH to atmosphere and thereby cause interruption of ahead drive. When the pressure in the ahead valve cavity 173 and connecting cavities and passages to the detent plungers is reduced to a value at which the ahead tire is disengaged the neutral detent plunger 203 will be moved out of the neutral detent slot 205 by the spring 207 acting thereon and the slow speed detent plunger 191 will also be moved into the slow speed detent slot 193 by the spring 195 acting thereon which allows the maneuvering lever MCI to then be moved to the slow speed astern or ahead positions only.

Movement of the maneuvering control lever MCI to the slow speed astern position causes clockwise movement of the control shaft 107 and lever 109 fixed thereon to cause movement of the governor speed setting lever S by the link 111 from the idle position to the slow speed position. The operating shaft 121 of the control valve CVA will accordingly be moved counterclockwise to the slow speed astern position by the link 117A which causes the ball 187 to be moved out of the cam slot 189' in the shaft 121 to cause the push rod 179' to move outwardly and unseat the astern clutch dumb-bell control valve 175'. Unseating of the valve 175' permits pressure to enter the astern control valve cavity 173' from the pressure cavity 165 in the upper control valve CVA through the port in the valve plate 171' to apply pressure to the passage 219' leading from the cavity 173' to the annular port 215' in the passage 219 which also opens into the control valve cavity 217'. Upon a rise in pressure above that of atmosphere the pressure applied to the right side of piston 229 of the double check valve 221 through the passage in the annular seat portion 225 causes the piston to move to the left and seat on the annular seat portion 223 of the check valve and causes pressure to be applied to the annular port 213. The port 213, as previously described is connected to the piston portions of the neutral and slow speed detent plungers 191 and 203 and the neutral plunger will be moved into contact with the control valve shaft 121 adjacent the neutral detent slot by this initial rise in pressure in the same manner as previously described.

The pressure in the cavity 217' will also be transmitted through the port 247 therein and through the registering port 247A opening into the passage 249 in the selector valve SV extending to the annular port 251 of the selector valve. The initial rise in pressure in the annular port 251 causes pressure to be applied to the right side of the piston of the double check valve 221AS through the axial and radial opening in the annular seat portion 223 of the check valve to cause the piston to move into seating relation with the annular seat portion 225 of the valve and apply pressure to the annular port 223 of the selector valve opening into the passage 257 extending to the cavity 259. The cavity 259 is connected by the pipe 254AS to the other quick release valve V which is connected by the pipe 260AS to the pressure sealing means 5 for the astern driving clutch tire AST and pressure accordingly will be applied to this tire.

When the pressure in the tire AST and above described connecting passages thereto increases to a value necessary to cause driving engagement of the tire the slow speed detent plunger 191 will be again moved out of the slow speed detent slot 193 in the control valve operating shaft 121 to permit movement of the maneuvering lever MCI to the full speed astern position. This causes movement of the governor speed setting lever S to the full speed position and movement of the level 119S and operating control shaft 121 to the full speed astern position to cause full speed astern drive of the propulsion means in the manner previously described. It will be evident that movement of the maneuvering control lever MCI back to the neutral position causes the governor speed setting lever S to be moved back to the idle position and the lever 119A and operating shaft to be moved back to the neutral position so that the neutral detent plunger 203 enters the neutral detent slot to stop further movement of the above elements. With the operating shaft 121 in the neutral position the control valve cavity 173 and all of the passages in the control and selector valve connected between this cavity and the quick release valve V of the astern clutch tire AST are vented to atmosphere through the bore and vent hole 181' of the push rod 179' which causes the quick release valve to act and cause quick release of the pressure in the astern clutch tire AST to atmosphere. When the pressure in the tire AST and connection passages to the control and selector valves again decreases to a value sufficient to cause disengagement of the astern driving tire AST and interruption of astern drive of the propulsion means the slow speed detent plunger 191 re-enters the slow speed detent slot 193 in the shaft 121 and the neutral detent plunger 203 is moved out of the neutral detent slot 205 therein by action of the plunger springs in a similar manner to that previously described.

It will be apparent that the preferred form of the invention includes the same features as the previously described form and in addition also includes two identical clutch control valves CVA and CVB having ports registering with ports of the selector valve SV whereby either control valve is rendered operative and the maneuvering control lever MCI is likewise provided with manually operable selector means for causing operation of either of the control valves. Each control valve includes slow and neutral detent means and a double check valve to insure proper operation of the detent means thereby to insure proper manual operation of the maneuvering lever and engagement of either the ahead or astern driving clutch tires AHT and AST only after disengagement of both to then permit an increase in the engine speed to cause an increase from slow speed ahead or to full speed ahead or astern drive. The control valves may be interchangeably mounted on the selector valve and one may be removed for repairs while the other is being operated by reason of the double check valves 221AH and 221AS connected between the ahead and astern ports passages and cavities in the control and selector valve housings thereby eliminating all external pipe connections except those to the pressure source and to each of the ahead and astern driving tires AHT and AST best shown diagrammatically in Figure 16.

It will be evident that the control systems illustrated are adapted to control other forms of driving systems employing either pressure actuated clutches or brakes for obtaining forward or reverse drive in a similar manner.

I claim:

1. A maneuvering control system comprising forward and reverse variable speed driving means, speed controlling means, reversing controlling means, a manually operable control lever for controlling said speed and reversing controlling means, said lever being movable between neutral and slow and full speed forward and reverse driving controlling positions, slow speed detent means for normally preventing movement of said lever beyond slow speed forward and reverse driving controlling positions, said slow speed detent means being releasable to permit further movement of said lever to full speed forward and reverse driving controlling positions, neutral detent means operable for preventing movement of said lever through the neutral controlling position and means interconnected with said forward and reverse driving means, said detent means and said reversing controlling means to render said slow speed detent means releasable upon establishment of slow speed forward or reverse drive and for rendering said neutral detent operative until forward and reverse drive is discontinued.

2. A control system for a variable speed reverse driving system including a prime mover and a reversing gear provided with pressure engaged means for causing forward or reverse drive, said control system comprising prime mover speed controlling means, pressure application and relief reversing valve controlling means for controlling separate engagement and simultaneous disengagement of said pressure engaged means causing forward or reverse drive, a manually operable control lever movable between a neutral idling speed controlling position and slow and full speed forward and reverse driving controlling positions for controlling said speed controlling and said reversing valve controlling means in order to cause a gradual speed increase in forward or reverse drive, slow speed detent means normally preventing movement of said lever beyond slow speed forward or reverse driving controlling positions, said slow speed detent means being releasable by pressure in either of said pressure engaged means necessary to cause engagement thereof to then permit movement of said lever to either full speed positions, neutral detent means operable by pressure in either of said pressure engaged means to prevent movement of said lever through the neutral position, and pressure operated means interconnected with said pressure engaged means, said reversing valve controlling means and said detent means to render said detent means responsive to pressure in either of said pressure engaged means.

3. A control system for a variable speed reverse driving system including a prime mover and a reversing gear provided with pressure engaged friction means for causing forward or reverse drive, said control system comprising prime mover speed controlling means, a plurality of pressure application and relief reversing control valves for said pressure engaged friction means, a manually operable control lever movable between neutral no-drive, and slow and full speed forward and reverse driving controlling positions for operating said speed controlling means and for selectively operating any one of said control valves, each of said valves including pressure released slow speed detent lever positioning means, pressure engaged neutral detent lever positioning means and means responsive to pressure in either of said pressure engaged friction means to render said detent means operative to prevent movement of said lever beyond slow speed forward and reverse driving controlling positions until slow speed forward or reverse drive is established and to prevent movement of said lever through said neutral position until forward or reverse drive is discontinued.

4. A control system for a variable speed reverse driving system including a prime mover and a reversing gear provided with pressure engaged forward and reverse driving means driven by said prime mover, said control system comprising a plurality of pressure application and relief reversing control valves for said pressure engaged forward and reverse driving means, prime mover speed controlling means, a control lever movable between a neutral engine idling speed no-driving controlling position and slow and high speed forward and reverse driving controlling positions for operating said speed controlling means and for selectively operating any of said control valves, each of said control valves comprising an operating shaft, pressure releasable forward and reverse slow speed detent means and pressure operated neutral detent means for said valve operating shaft, and pressure operated means for applying pressure to said detent means upon application of pressure to either of said pressure engaged forward and reverse driving means, said slow speed detent means being releasable by establishment of slow speed forward or reverse drive and said neutral detent means being operable until drive is discontinued, manually operable pressure application and relief selector valve means for each of said control valves and pressure operated valves interconnected between each of said pressure engaged means and said control valves to prevent flow of pressure between said control valves.

5. A control system for a variable speed reverse driving system including a prime mover having speed controlling means and a reversing gear provided with pressure engaged means for causing forward or reverse drive, said control system comprising a control stand including a selector valve, a pair of pressure application and relief reversing control valves adapted to be interchangeably mounted thereon, and a control lever movable between neutral and forward and reverse slow and full speed controlling positions for operating said prime mover speed controlling means and for also selectively operating either reversing control valve, said selector valve having pressure passages extending to each of said control valves and each pressure engaged forward and reverse driving means to permit pressure to be applied to or vented from either control valve to render either valve operable and pressure operated means in certain of said passages in said selector valve to prevent flow of pressure between said control valves in order to permit either control valve to be removed when not operated.

6. A control system for a variable speed reverse driving system including a prime mover and a reversing gear therefor provided with pressure engaged means for causing forward or reverse drive, said control system comprising a control stand including a selector valve, a pair of reversing control valves for selectively controlling said pressure engaged means, said selector valve and said control valves having communicating ports and passages, manually operable valves in certain of the passages of said selector valve to permit pressure to be applied to either control valve, check valves in other of said selector valve passages separately connected to said pressure engaged means to permit flow of pressure between either control valve and either pressure engaged means and to prevent flow of pressure between said control valves enabling either valve to be removed when not in use, and a manually operable reversing control lever for selectively operating either of said control valves.

7. A control system for a variable speed reverse driving system including a prime mover having speed controlling means and a reversing gear driven by the prime mover, said reversing gear including separate pressure engaged means for causing forward or reverse drive, said control system comprising a control stand, including a selector valve, a pair of reversing control valves for controlling the application of pressure to either pressure engaged means and a manually operable control lever movable between neutral and slow and full speed forward and reverse positions for operating said prime mover speed controlling means and for also selectively operating said reversing control valves, said selector valve and said reversing control valves having communicating ports and passages, manually operable valves in certain of the passages of said selector valve to render said control valves selectively operable, double check valves in other of said selector valve passages which are separately connected to said control valves and said pressure engaged means to permit selective control of either of said pressure engaged means by either of said control valves and to prevent flow of pressure between said control valves thereby allowing either control valve to be removed when not in use, each of said control valves including an operating shaft, pressure released and pressure engaged detent means for limiting movement of said operating shaft and a double check valve between said detent means and separate passages in said control valve communicating with the separate passages in said selector valve connected to each of said pressure engaged means to permit application of pressure to said detent means when pressure is applied to either pressure engaged means, said pressure released detent means being operable in response to pressure necessary to cause slow speed engagement of either pressure engaged means to then permit movement of said control lever between low and full speed forward or reverse controlling positions, and said pressure engaged detent means being operable by slight pressure in either pressure engaged means to prevent movement of said control lever through the neutral position until forward or reverse drive is interrupted.

WILLIAM E. BRILL.